US011303242B2

(12) United States Patent
Sun et al.

(10) Patent No.: US 11,303,242 B2
(45) Date of Patent: Apr. 12, 2022

(54) METHOD AND APPARATUS FOR WIRELESS POWER TRANSFER TO AN INDEPENDENT MOVING CART

(71) Applicant: Rockwell Automation Technologies, Inc., Mayfield Heights, OH (US)

(72) Inventors: Xikai Sun, Shanghai (CN); Peter M. Smit, Mount Sinai, NY (US); Oliver C. Haya, Milwaukee, WI (US); Mark R. Cooper, Eden Prairie, MN (US); Nanwei Yao, Edina, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 234 days.

(21) Appl. No.: 16/594,751

(22) Filed: Oct. 7, 2019

(65) Prior Publication Data
US 2020/0044593 A1    Feb. 6, 2020

Related U.S. Application Data

(63) Continuation of application No. 15/686,752, filed on Aug. 25, 2017, now Pat. No. 10,483,895.

(51) Int. Cl.
*H02P 25/064*    (2016.01)
*H02P 27/06*    (2006.01)
(Continued)

(52) U.S. Cl.
CPC .......... *H02P 25/064* (2016.02); *B60L 15/005* (2013.01); *B60L 15/007* (2013.01);
(Continued)

(58) Field of Classification Search
CPC ...... H02M 5/458; H02M 5/4585; H02M 1/08; H02P 27/06; Y02B 70/1483
See application file for complete search history.

(56) References Cited

U.S. PATENT DOCUMENTS 3,659,168 A * 4/1972 Salihi .................... H02M 7/525
318/800
4,427,910 A   1/1984 Richter et al.
(Continued)

FOREIGN PATENT DOCUMENTS

EP    2806547 A1   11/2014
EP    3151397 A1    4/2017
(Continued)

OTHER PUBLICATIONS

European Patent Examination Communication Report dated May 26, 2021; Application No. 18 190 180.2-1202—(4) pages.
(Continued)

*Primary Examiner* — Muhammad S Islam
*Assistant Examiner* — Devon A Joseph
(74) *Attorney, Agent, or Firm* — Boyle Fredrickson, SC

(57) ABSTRACT

A system and method for wirelessly providing power to independent movers traveling along a track includes a sliding transformer to transfer power between the track and each mover. The sliding transformer includes a primary winding extending along the track and a secondary winding mounted to each mover. Each of the primary and secondary windings may be formed of a single coil or multiple coils. The primary and secondary windings are generally aligned with each other and extend along the track and along the mover in the direction of travel with an air gap present between the windings. A power converter on the mover may regulate the power supplied to the mover to control an actuator or a sensor mounted on the mover or to activate drive coils mounted on the mover to interact with magnets mounted along the track and, thereby, control motion of each mover.

20 Claims, 12 Drawing Sheets

(51) Int. Cl.
   *H02J 50/10* (2016.01)
   *H02P 6/00* (2016.01)
   *H02P 6/04* (2016.01)
   *H02K 41/03* (2006.01)
   *H01F 38/14* (2006.01)
   *B60L 15/00* (2006.01)
   *B65G 54/02* (2006.01)

(52) U.S. Cl.
   CPC .............. *H01F 38/14* (2013.01); *H02J 50/10* (2016.02); *H02K 41/031* (2013.01); *H02P 6/006* (2013.01); *H02P 6/04* (2013.01); *H02P 27/06* (2013.01); *B60L 2200/26* (2013.01); *B65G 54/02* (2013.01)

(56) References Cited

U.S. PATENT DOCUMENTS

| | | | |
|---|---|---|---|
| 5,013,929 A | 5/1991 | Dhyanchand | |
| 5,072,493 A | 12/1991 | Hommes et al. | |
| 5,293,308 A * | 3/1994 | Boys | H02J 50/12 363/37 |
| 5,341,280 A | 8/1994 | Divan et al. | |
| 5,433,311 A * | 7/1995 | Bonnet | B65G 17/345 198/370.04 |
| 5,690,209 A | 11/1997 | Kofoed | |
| 5,737,211 A * | 4/1998 | Hirai | H01F 38/14 363/144 |
| 5,927,657 A * | 7/1999 | Takasan | B61L 3/225 246/194 |
| 6,191,507 B1 * | 2/2001 | Peltier | B65G 54/02 310/12.02 |
| 6,515,878 B1 * | 2/2003 | Meins | B60L 5/005 363/37 |
| 6,522,035 B1 | 2/2003 | Smit | |
| 6,844,651 B1 | 1/2005 | Swift et al. | |
| 6,876,107 B2 | 4/2005 | Jacobs | |
| 7,109,610 B2 | 9/2006 | Tamai | |
| 7,559,282 B2 | 7/2009 | Austin | |
| 7,696,651 B2 | 4/2010 | Miyamoto | |
| 7,786,685 B2 | 8/2010 | Schueren | |
| 8,384,251 B2 | 2/2013 | Shikayama et al. | |
| 8,776,694 B2 | 7/2014 | Rosenwinkel et al. | |
| 8,844,250 B2 | 9/2014 | Nemkov et al. | |
| 9,102,336 B2 | 8/2015 | Rosenwinkel | |
| 9,333,875 B2 | 5/2016 | Staunton et al. | |
| 10,608,469 B2 | 3/2020 | Floresta et al. | |
| 2003/0201862 A1 | 10/2003 | Arntz et al. | |
| 2003/0230941 A1 * | 12/2003 | Jacobs | B29C 66/1122 310/12.19 |
| 2004/0227412 A1 * | 11/2004 | Tamai | H02K 41/03 310/12.19 |
| 2009/0045773 A1 | 2/2009 | Pandya et al. | |
| 2009/0212728 A1 * | 8/2009 | Yagi | H02P 21/06 318/437 |
| 2009/0303749 A1 * | 12/2009 | Boys | H02J 50/12 363/13 |
| 2010/0130096 A1 | 5/2010 | Baarman et al. | |
| 2010/0231163 A1 * | 9/2010 | Mashinsky | H02J 50/40 320/108 |
| 2010/0276256 A1 * | 11/2010 | Kleinikkink | B65G 35/066 198/793 |
| 2011/0043053 A1 * | 2/2011 | Shikayama | H02K 11/215 310/12.15 |
| 2011/0253495 A1 * | 10/2011 | Vollenwyder | B60L 53/12 191/10 |
| 2012/0055751 A1 * | 3/2012 | Vollenwyder | B60L 53/12 191/10 |
| 2012/0145500 A1 * | 6/2012 | Staunton | H02J 50/40 191/10 |
| 2012/0146425 A1 * | 6/2012 | Lee | H04B 5/0093 307/104 |
| 2012/0247925 A1 | 10/2012 | Cooke | |
| 2013/0019773 A1 * | 1/2013 | Rosenwinkel | B65G 47/96 104/118 |
| 2014/0265645 A1 | 9/2014 | Jacobs et al. | |
| 2014/0285034 A1 * | 9/2014 | Krop | H02K 41/031 310/12.18 |
| 2014/0331888 A1 | 11/2014 | Wernersbach et al. | |
| 2015/0048693 A1 | 2/2015 | Prussmeier | |
| 2015/0244176 A1 * | 8/2015 | Van Den Brink | H04B 5/0037 307/104 |
| 2015/0344233 A1 | 12/2015 | Kleinikkink et al. | |
| 2015/0364944 A1 * | 12/2015 | Garcia Briz | H02J 7/0029 307/104 |
| 2016/0090275 A1 | 3/2016 | Piech et al. | |
| 2016/0152141 A1 | 6/2016 | Ragazzini | |
| 2016/0294227 A1 * | 10/2016 | Podkamien | H02J 50/12 |
| 2016/0339785 A1 * | 11/2016 | Rumbak | H02J 50/12 |
| 2016/0352147 A1 * | 12/2016 | Von Novak, III | H02J 50/80 |
| 2016/0381829 A1 * | 12/2016 | Niizuma | B60L 53/124 361/699 |
| 2017/0043672 A1 * | 2/2017 | Araki | H02J 50/60 |
| 2017/0081135 A1 * | 3/2017 | Wernersbach | B60L 13/006 |
| 2017/0183170 A1 | 6/2017 | Wernersbach et al. | |
| 2017/0194092 A1 * | 7/2017 | Vix | H01F 3/14 |
| 2018/0109144 A1 * | 4/2018 | Moffatt | H04B 5/0081 |
| 2018/0248460 A1 * | 8/2018 | Borghi | H02K 41/03 |

FOREIGN PATENT DOCUMENTS

| | | |
|---|---|---|
| GB | 2463692 A | 3/2010 |
| WO | 99/08359 A1 | 2/1999 |
| WO | 2010/129369 A2 | 11/2010 |
| WO | 2012/138949 A2 | 10/2012 |
| WO | 2016/206757 A1 | 12/2016 |

OTHER PUBLICATIONS

Extended European Search Report dated Sep. 23, 2020; Application No. Patent No. 20182346.5-1202—(9) pages.
Barnard et al.; Sliding Transformers for Linear Contactless Power Delivery; IEEE Transactions on Industrial Electronics, vol. 44, No. 6, Dec. 1997—(6) pages.
Klontz et al.; Contactless Power Delivery System for Mining Applications; IEEE Transactions on Industry Applications, vol. 31, No. 1 Jan./Feb. 1995—(9) pages.
Rockwell. Automation: "Introducing iTRAK: The intelligent Track System"; YouTube.com—(1) page, Published May 20, 2015.
Rockwell Automation: "User Manual—iTRAK System": Bulletin 2198T; Jun. 30, 2017, XP055511206, Retrieved from the Internet: URL:https://literature.rockwellautomation.com/idc/groups/iiterature/documents/um/2198t-um001_-en-p.pdf—(138) pages.
Extended European Search Report dated Oct. 23, 2018—(12) pages.
European Examination Communication pursuant to Article 94(3) EPC; Application No. EP18190180.2 dated Feb. 11, 2022—(4) pages.

* cited by examiner

METHOD AND APPARATUS FOR WIRELESS POWER TRANSFER TO AN INDEPENDENT MOVING CART This application is a continuation of and claims priority to U.S. application Ser. No. 15/686,752, filed Aug. 25, 2017, the entire contents of which is incorporated herein by reference.

BACKGROUND INFORMATION

The present invention relates to motion control systems and, more specifically, to wireless power transfer between a track and an independent mover in a motion control system incorporating multiple movers propelled along the track using a linear drive system.

Motion control systems utilizing movers and linear motors can be used in a wide variety of processes (e.g. packaging, manufacturing, and machining) and can provide an advantage over conventional conveyor belt systems with enhanced flexibility, extremely high speed movement, and mechanical simplicity. The motion control system includes a set of independently controlled "movers" each supported on a track for motion along the track. The track is made up of a number of track segments, and a linear drive system controls operation of the movers, causing the movers to travel along the track. Sensors may be spaced at fixed positions along the track and/or on the movers to provide information about the position and speed of the movers.

Each of the movers may be independently moved and positioned along the track in response to an electromagnetic field generated by the linear drive system. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

In certain applications, it may be desirable to provide an actuator or a sensor on the mover to interact with the product on the mover. For example, a clamp may actuate to secure the product to the mover or a sensor may detect the presence of the product on the mover. However, the actuator or sensor requires an energy source to operate. For electric actuators or sensors, the energy source may be a battery. For a hydraulic or pneumatic actuator, the energy source may be a pressurized tank. The energy source adds weight and takes up space on the mover. Further, the energy source needs to be periodically recharged.

One solution for providing energy to a mover is to provide a dedicated location along the track at which the energy is supplied. The mover stops at the dedicated location where a temporary connection to an energy source may be established. A first actuator external to the mover may engage the mover and establish an electrical, pneumatic, or hydraulic connection to the mover. A second actuator on the mover may perform the desired task, and the first actuator supplying power may subsequently disengage from the mover. This process, however, requires the mover to come to a stop at the dedicated location, wait for power to be connected, perform the desired action, and wait for the power to be disconnected before resuming motion. The additional steps required to supply power reduce the throughput of the system and the dedicated locations limit the ability of actuators or sensors present on a mover to operate.

Thus, it would be desirable to provide an improved system for supplying power to independent movers on a track in a motion control system.

Another solution for providing energy to a mover is to provide a fixed connection to the mover. The fixed connection may be, for example, an electrical conductor or a hydraulic or pneumatic hose. A fixed connection, however, is not without certain drawbacks. The motion of the mover is typically restricted to limit the required length of the electrical conductor or hose. The number of movers must be limited and/or the motion of the mover is limited to a reciprocal motion to avoid tangling the conductors or hoses between movers.

Thus, it would be desirable to provide a method and apparatus for wirelessly transmitting power between a track and independent movers in a motion control system to eliminate a fixed connection between the mover and a power source.

Historically, the linear drive system has included multiple coils spaced along the track and magnets mounted to each of the movers. The magnets on the movers may include multiple magnet segments with alternating north and south poles oriented to face the track. Each pair of north and south poles corresponds to a pole pair in the linear drive system. The coils along the track are sequentially energized with an alternating current which establishes an electromagnetic field around the coil. The electromagnetic field interacts with the magnetic field generated by the pole pairs on the movers and is controlled to drive the movers along the track. This arrangement, however, requires power converters corresponding to the coils spaced along the track to control the current through each coil. The linear drive system may require twice as many power converters as movers present on the track and include a significant portion of idle time while no mover is present over a coil controlled by the power converter.

Thus, it would be desirable to provide a system for wirelessly providing sufficient power to each mover to supply power to coils on the mover which, in turn, interact with magnets mounted along the track to control operation of each mover.

BRIEF DESCRIPTION

The subject matter disclosed herein describes a system and method for wirelessly providing power to independent movers traveling along a track. A power converter on the mover may regulate the power supplied to the mover to control an electrical device, such as an actuator or a sensor mounted on the mover. The power converter on the mover may also be configured to activate drive coils mounted on the mover to interact with magnets mounted along the track and, thereby, control motion of each mover.

According to one embodiment of the invention, a sliding transformer is provided to transfer power between the track and each mover. The sliding transformer includes a primary winding extending along the track and a secondary winding mounted to each mover. The primary winding may be a single coil or multiple coils. If formed as a single coil, the primary winding may include a pair of bus bars extending along the track where one bus bar defines a forward conduction path and the other bus bar defines a return conduction path. If the primary winding is formed of multiple coils, a conductor may be wound along the track in the direction of travel to define the forward and reverse conduction paths or, optionally, multiple traces on a printed circuit board may be formed. It is contemplated that the primary winding may be formed of a number of closed loops extending along a portion of the track. The track, for example, may include multiple track segments and a single primary winding may extend along the surface of each track segment. The secondary winding may similarly be a single coil or multiple coils. If formed as a single coil, the secondary winding may include a pair of bus bars extending along the mover in the direction of travel where one bus bar defines a forward conduction path and the other bus bar defines a return conduction path. If the secondary winding is formed of multiple coils, a conductor may be wound along the mover in the direction of travel to define the forward and reverse conduction paths or, optionally, multiple traces on a printed circuit board may be formed. Each mover includes a single secondary winding and multiple movers travel along the track. The primary and secondary windings are generally aligned with each other and extend along the track and along the mover in the direction of travel with an air gap present between the windings.

In one embodiment of the invention an apparatus for wireless power transfer in a motion control system is disclosed. The apparatus includes multiple movers, multiple electrical devices, and a closed track. At least one of the electrical devices is mounted to each of the movers, and the closed track defines a continuous path along which each of the movers travels. A primary winding is mounted along the closed track and includes a primary forward conduction path and a primary reverse conduction path. The primary forward conduction path and the primary reverse conduction path are spaced apart from each other and extend longitudinally in a direction of travel along the continuous path. The primary winding is configured to receive power from a power supply. The apparatus also includes multiple secondary windings, where each secondary winding is mounted to one of the plurality of movers and each secondary winding includes a secondary forward conduction path and a secondary reverse conduction path. The secondary forward conduction path and the secondary conduction path are spaced apart from each other and extend along the mover in the direction of travel. Each of the secondary forward and reverse conduction paths are generally aligned with the primary forward and reverse conduction paths with an air gap separating the secondary forward and reverse conduction paths from the primary forward and reverse conduction paths as the mover travels along the closed track. The apparatus also includes multiple power converters. Each of the power converters is mounted to one of the movers and is operative to receive power from the secondary winding mounted to the mover and to supply power to the at least one electrical device mounted on the mover.

According to another embodiment of the invention, a method for wirelessly transferring power between a plurality of movers in a motion control system and a closed track along which each of the plurality of movers travels is disclosed. Power is provided from a power supply to a primary winding mounted along the closed track. The primary winding includes a primary forward conduction path and a primary reverse conduction path spaced apart from each other and extending longitudinally in a direction of travel along the closed track. Multiple movers are positioned along the closed track, where each of the plurality of movers includes a secondary winding and a power converter. The secondary winding has a secondary forward conduction path and a secondary reverse conduction path. The secondary forward conduction path and the secondary reverse conduction path are spaced apart from each other and extend along the mover in the direction of travel, and each of the secondary forward and reverse conduction paths are generally aligned with the primary forward and reverse conduction paths with an air gap separating the secondary forward and reverse conduction paths from the primary forward and reverse conduction paths as the mover travels along the closed track. Each power converter is operative to receive power from the secondary winding mounted to the mover and to supply power to at least one electrical device mounted on the mover.

According to still another embodiment of the invention, an apparatus for wireless power transfer in a motion control system is disclosed. The apparatus includes multiple movers and a closed track defining a continuous path along which each of the movers travels. A primary winding is mounted along the closed track, where the primary winding includes a primary forward conduction path and a primary reverse conduction path. The apparatus also includes multiple secondary windings, where each secondary winding is mounted to one of the movers, and each secondary winding includes a secondary forward conduction path and a secondary reverse conduction path. Each secondary winding is operative to receive power from the primary winding as the mover travels along the closed track. The apparatus also includes multiple motor drives, where each motor drive is mounted to one of the movers. Each motor drive includes a rectifier section and an inverter section. An input of the rectifier section is operative to receive power from the secondary winding mounted to the corresponding mover, and an output of the rectifier section is connected to a dc bus. An input of the inverter section is operative to receive power from the dc bus, and the motor drive is operative to provide a variable amplitude and variable frequency voltage at an output of the inverter section. A plurality of drive coils are mounted to each mover and connected to the output of the inverter section on the corresponding mover to receive the variable amplitude and variable frequency voltage.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
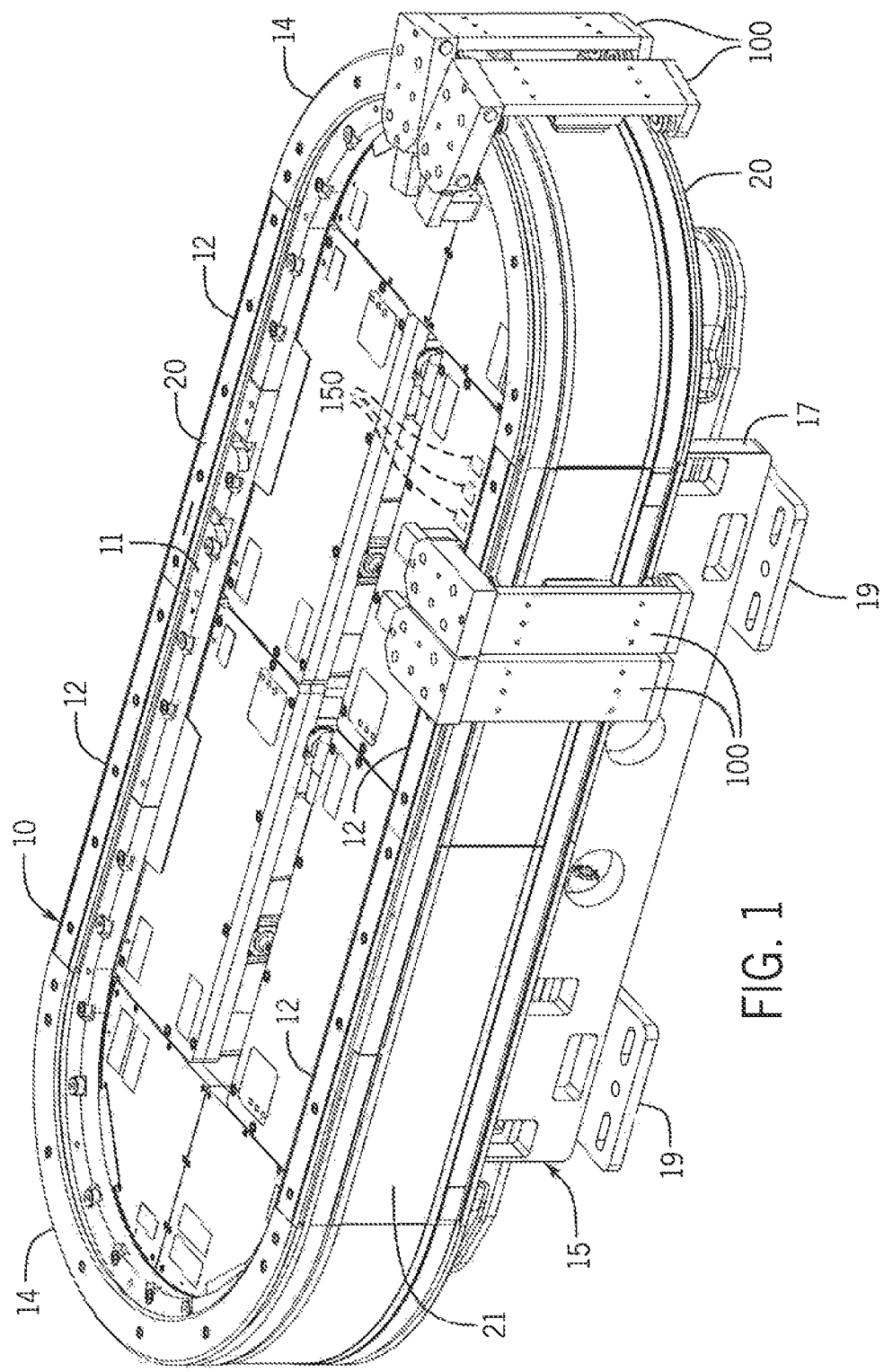
FIG. 1 is an isometric view of an exemplary transport system incorporating multiple movers travelling along a closed curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an exemplary transport system for moving articles or products includes a track 10 made up of multiple segments 12, 14. According to the illustrated embodiment, the segments define a generally closed loop supporting a set of movers 100 movable along the track 10. The track 10 is oriented in a horizontal plane and supported above the ground by a base 15 extending vertically downward from the track 10. According to the illustrated embodiment, the base 15 includes a pair of generally planar support plates 17, located on opposite sides of the track 10, with mounting feet 19 on each support plate 17 to secure the track 10 to a surface. The illustrated track 10 includes four straight segments 12, with two straight segments 12 located along each side of the track and spaced apart from the other pair. The track 10 also includes four curved segments 14 where a pair of curved segments 14 is located at each end of the track 10 to connect the pairs of straight segments 12. The four straight segments 12 and the four curved segments 14 form a generally oval track and define a closed surface over which each of the movers 100 may travel. It is understood that track segments of various sizes, lengths, and shapes may be connected together to form a track 10 without deviating from the scope of the invention.

For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. Further, each track segment 12, 14 is shown in a generally horizontal orientation. The track segments 12, 14 may also be oriented in a generally vertical orientation and the width of the track 10 may be greater in either the horizontal or vertical direction according to application requirements. The movers 100 will travel along the track and take various orientations according to the configuration of the track 10 and the relationships discussed herein may vary accordingly.

Each track segment 12, 14 includes a number of independently attached rails 20 on which each mover 100 runs. According to the illustrated embodiment, rails 20 extend generally along the outer periphery of the track 10. A first rail 20 extends along an upper surface 11 of each segment and a second rail 20 extends along a lower surface 13 of each segment. It is contemplated that each rail 20 may be a singular, molded or extruded member or formed from multiple members. It is also contemplated that the cross section of the rails 20 may be circular, square, rectangular, or any other desired cross-sectional shape without deviating from the scope of the invention. The rails 20 generally conform to the curvature of the track 10 thus extending in a straight path along the straight track segments 12 and in a curved path along the curved track segments 14. The rails 20 may be thin with respect to the width of the track 10 and span only a partial width of the surface of the track 10 on which it is attached. According to the illustrated embodiment, each rail 20 includes a base portion 22 mounted to the track segment and a track portion 24 along which the mover 100 runs. Each mover 100 includes complementary rollers 110 to engage the track portion 24 of the rail 20 for movement along the track 10.

Figure 3:
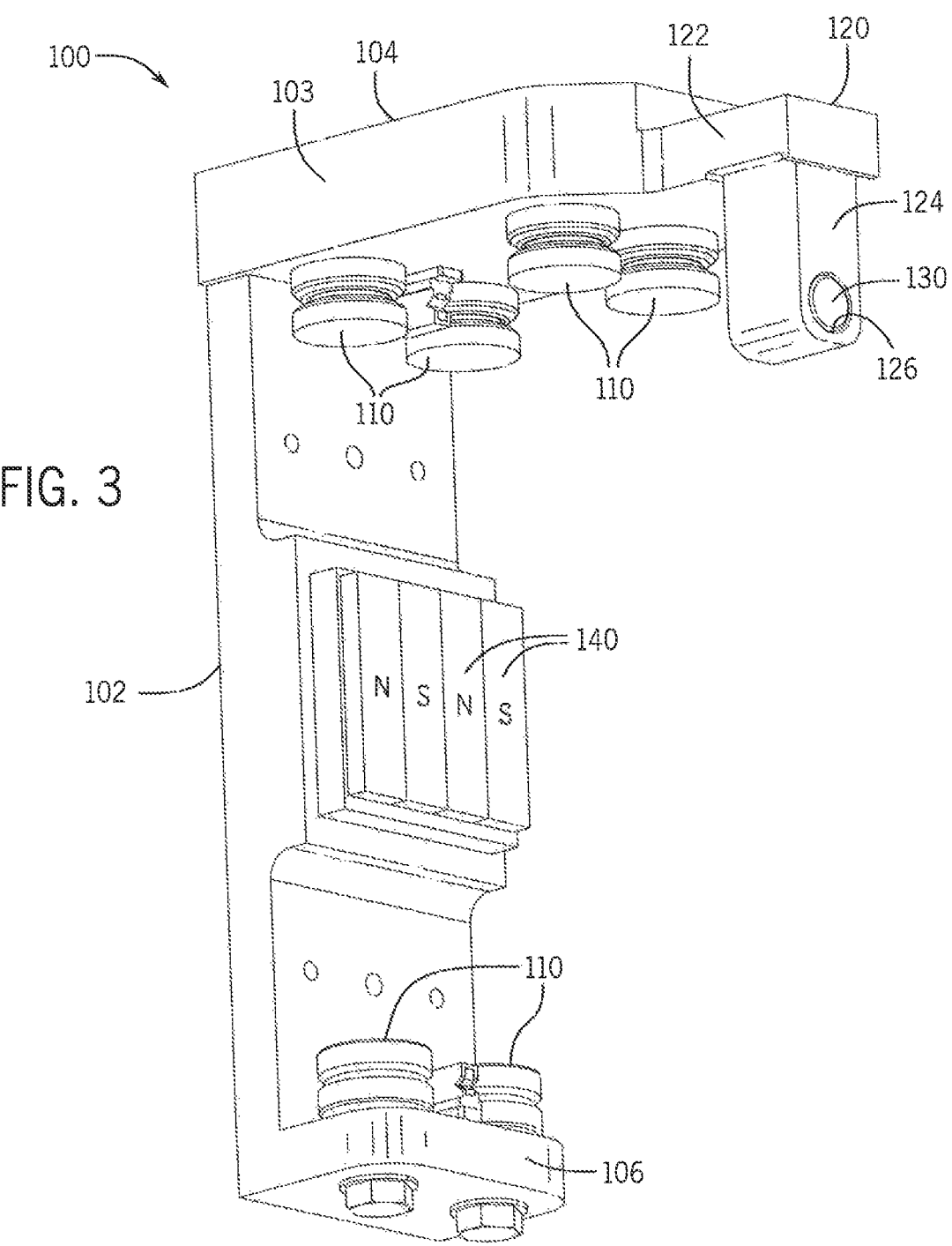
FIG. 3 is an isometric view of a mover from the transport system of FIG. 2.

One or more movers 100 are mounted to and movable along the rails 20 on the track 10. With reference next to FIG. 3, an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. The top member 104 includes a first segment 103, extending orthogonally from the side member 102 for the width of the rail 20, which is generally the same width as the side member 102. A set of rollers 110 are mounted on the lower side of the first segment 103 and are configured to engage the track portion 24 of the rail 20 mounted to the upper surface 11 of the track segment. According to the illustrated embodiment two pairs of rollers 110 are mounted to the lower side of the first segment 103 with a first pair located along a first edge of the track portion 24 of the rail and a second pair located along a second edge of the track portion 24 of the rail 20. The first and second edges and, therefore, the first and second pairs of rollers 110 are on opposite sides of the rail 20 and positively retain the mover 100 to the rail 20. The bottom member 106 extends generally orthogonal to the side member 102 at a bottom end of the side member 102 and extends for a distance sufficient to receive a third pair of rollers 110 along the bottom of the mover 100. The third pair of rollers 110 engage an outer edge of the track portion 24 of the rail 20 mounted to the lower surface 13 of the track segment. Thus, the mover 100 rides along the rails 20 on the rollers 110 mounted to both the top member 104 and the bottom member 106 of each mover 100. The top member 104 also includes a second segment 120 which protrudes from the first segment 103 an additional distance beyond the rail 20 and is configured to hold a position magnet 130. According to the illustrated embodiment, the second segment 120 of the top member 104 includes a first portion 122 extending generally parallel to the rail 20 and tapering to a smaller width than the first segment 103 of the top member 104. The second segment 120 also includes a second portion 124 extending downward from and generally orthogonal to the first portion 122. The second portion 124 extends downward a distance less than the distance to the upper surface 11 of the track segment but of sufficient distance to have the position magnet 130 mounted thereto. According to the illustrated embodiment, a position magnet 130 is mounted within a recess 126 on the second portion 124 and is configured to align with a sensor 150 mounted within the top surface 11 of the track segment.

Figure 2:
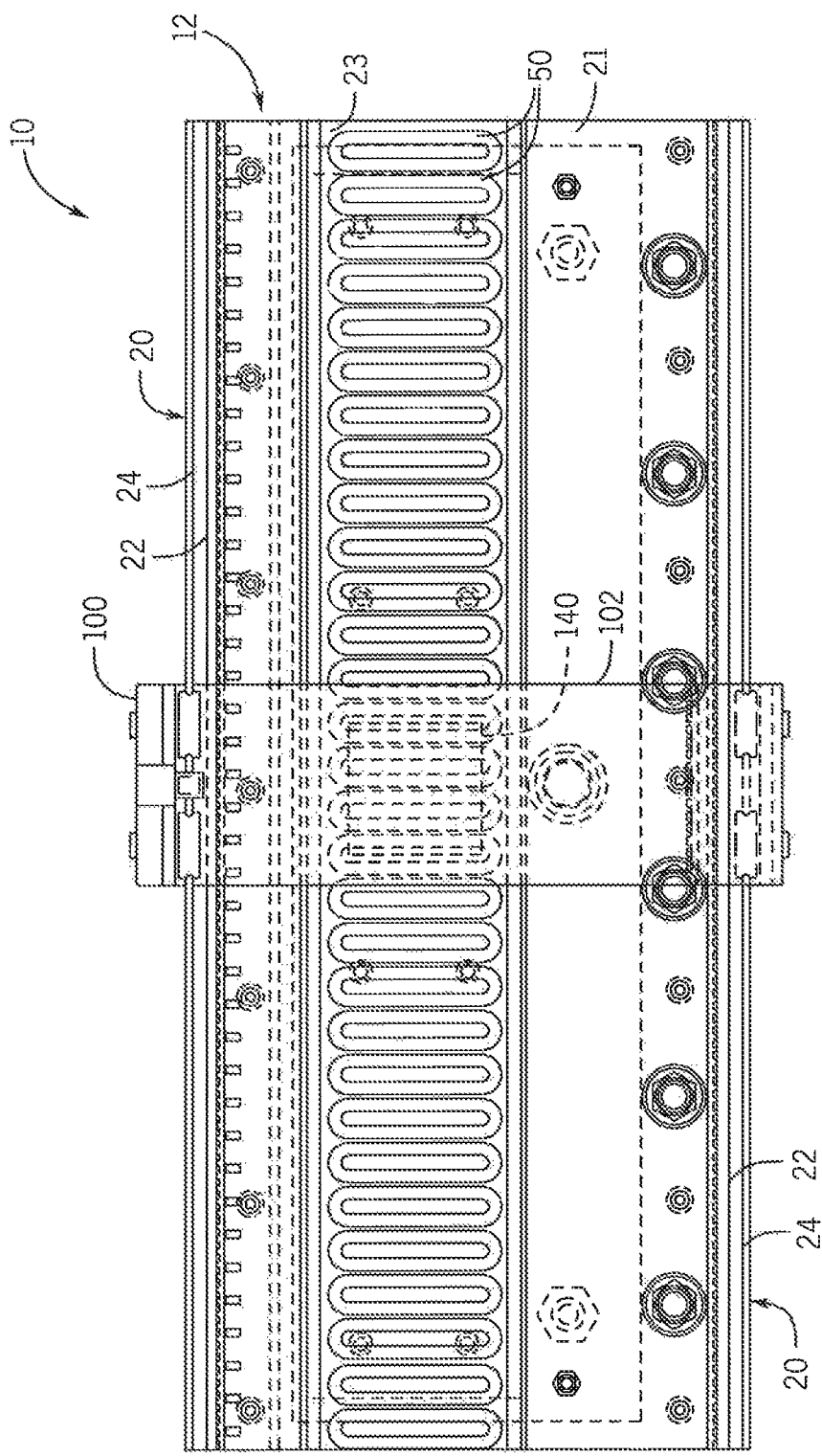
FIG. 2 is a partial side elevation view of one segment of one embodiment of the transport system of FIG. 1 illustrating activation coils distributed along one surface of the track segment.
Figure 4:
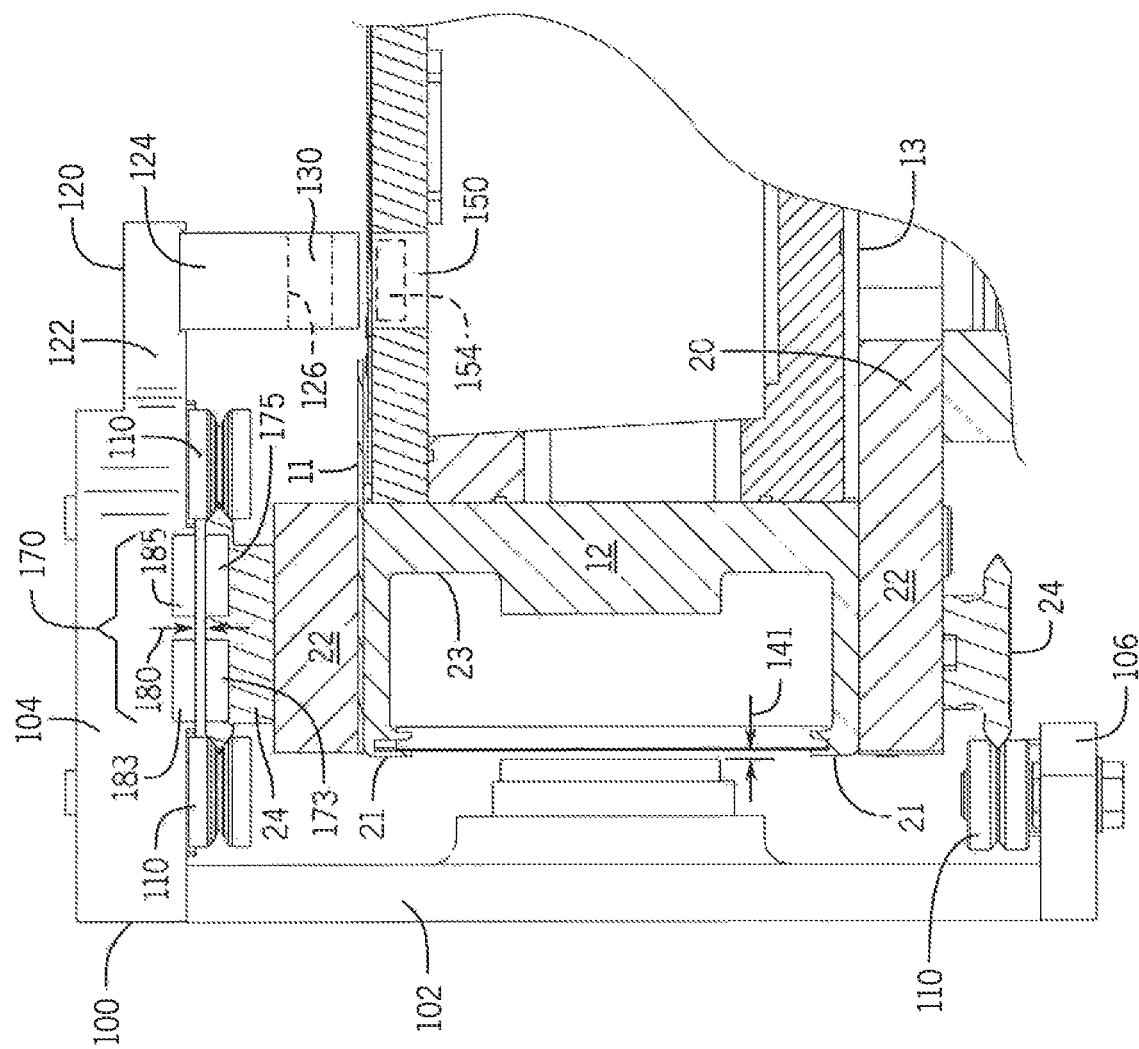
FIG. 4 is a partial sectional view of the transport system of FIG. 1.

A linear drive system is incorporated in part on each mover 100 and in part within each track segment 12, 14 to control motion of each mover 100 along the segment. According to one embodiment of the invention shown in FIG. 2, the linear drive system includes drive magnets 140 mounted to the side member 102. According to the illustrated embodiment, the drive magnets 140 are arranged in a block along an inner surface of the side member 102 with separate magnet segments alternately having a north pole, N, and south pole, S, pole facing the track segment 12. The drive magnets 140 are typically permanent magnets, and two adjacent magnet segments including a north pole and a south pole may be considered a pole-pair. The drive magnets 140 are mounted on the inner surface of the side member 102 and when mounted to the track 10 are spaced apart from a series of coils 50 extending along the track 10. As shown in FIG. 4, an air gap 141 is provided between each set of drive magnets 140 and the coils 50 along the track 10. On the track 10, the linear drive system includes a series of parallel coils 50 spaced along each track segment 12 as shown in FIG. 2. According to the illustrated embodiment, each coil 50 is placed in a channel 23 extending longitudinally along one surface of the track segment 12. The electromagnetic field generated by each coil 50 spans the air gap 141 and interacts with the drive magnets 140 mounted to the mover 100 to control operation of the mover 100.

Figure 11:
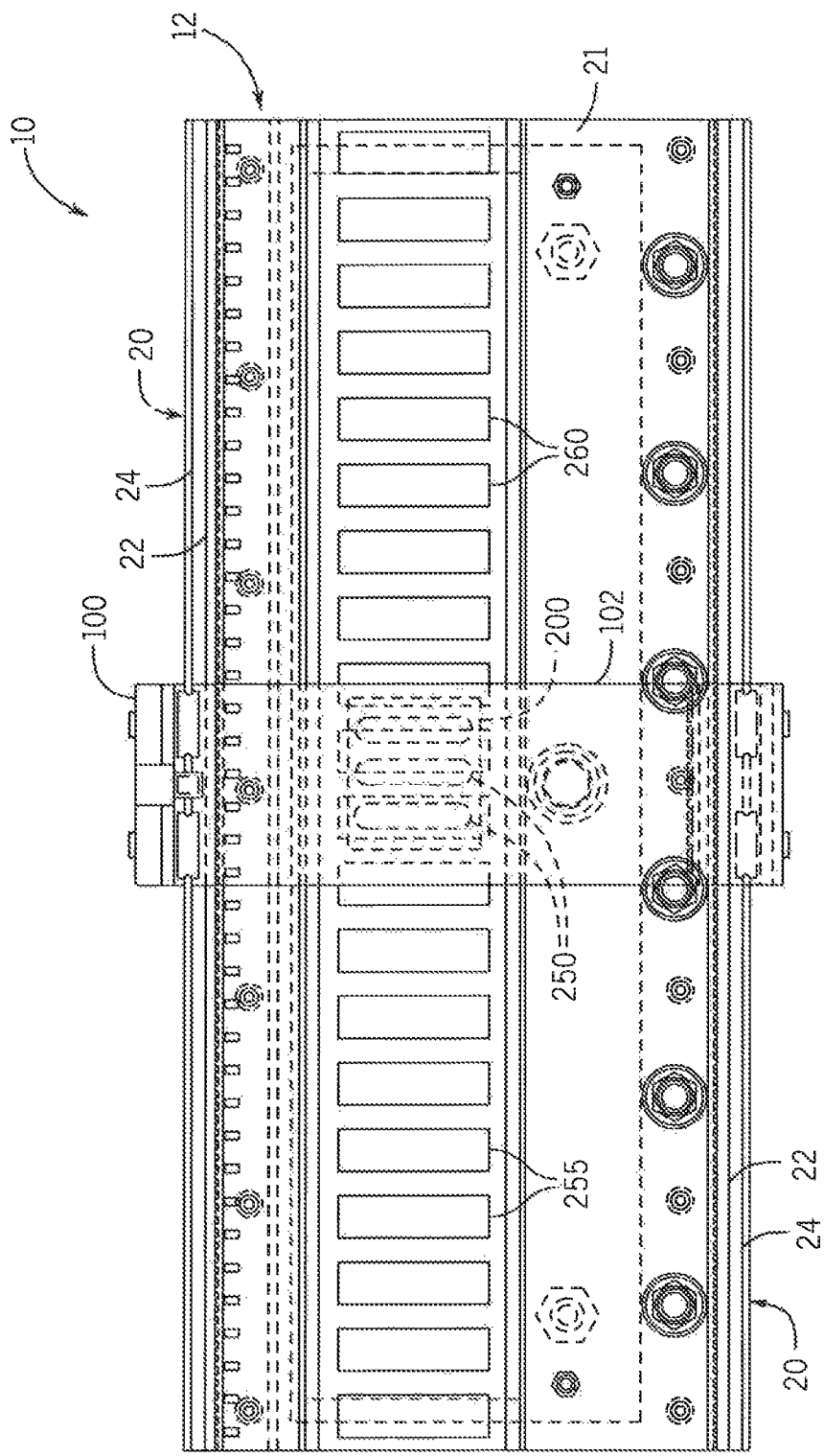
FIG. 11 is a partial side elevation view of one segment of another embodiment of the transport system of FIG. 1 illustrating driving magnets distributed along one surface of the track segment.
Figure 12:
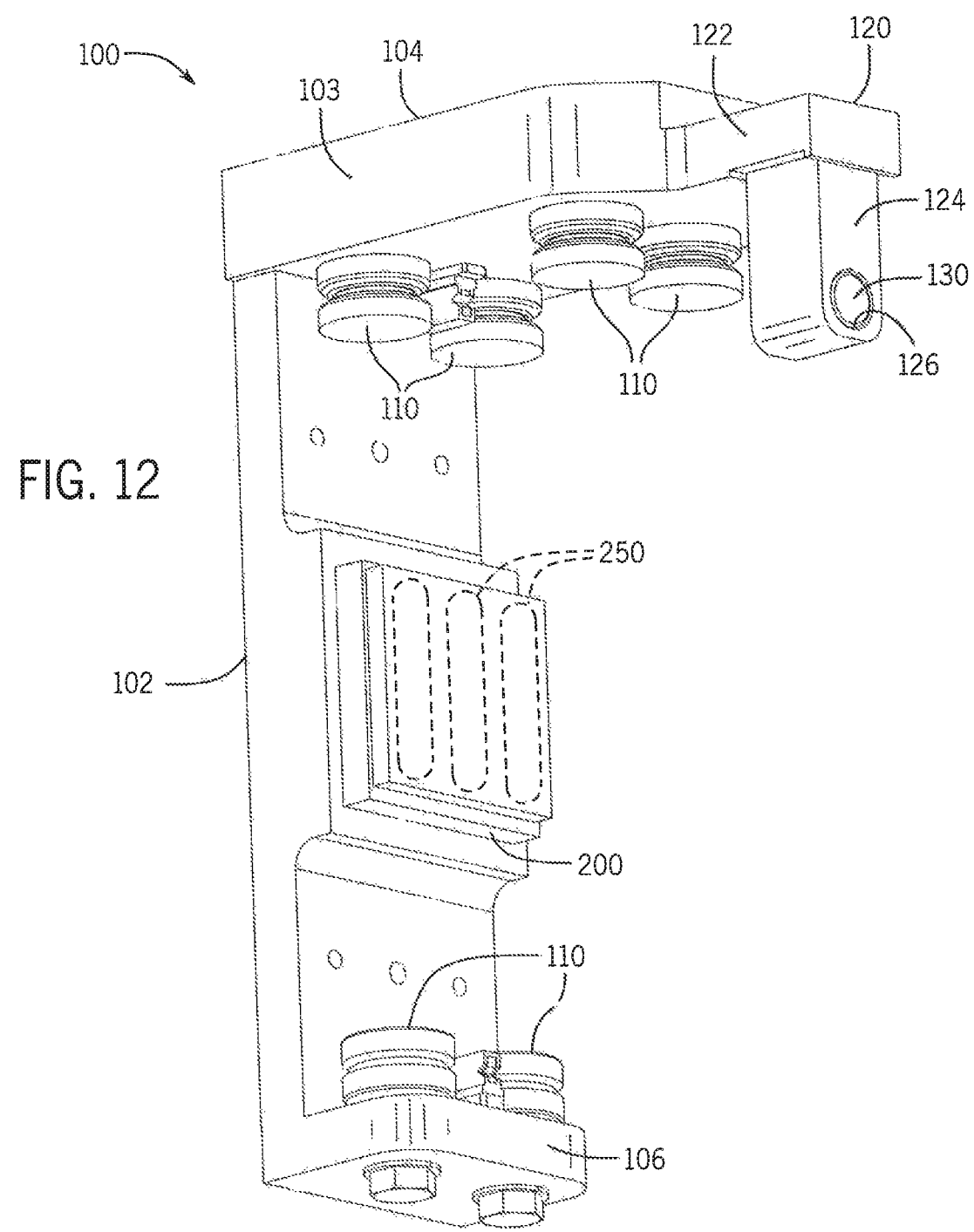
FIG. 12 is an isometric view of a mover from the transport system of FIG. 11.
Figure 13:
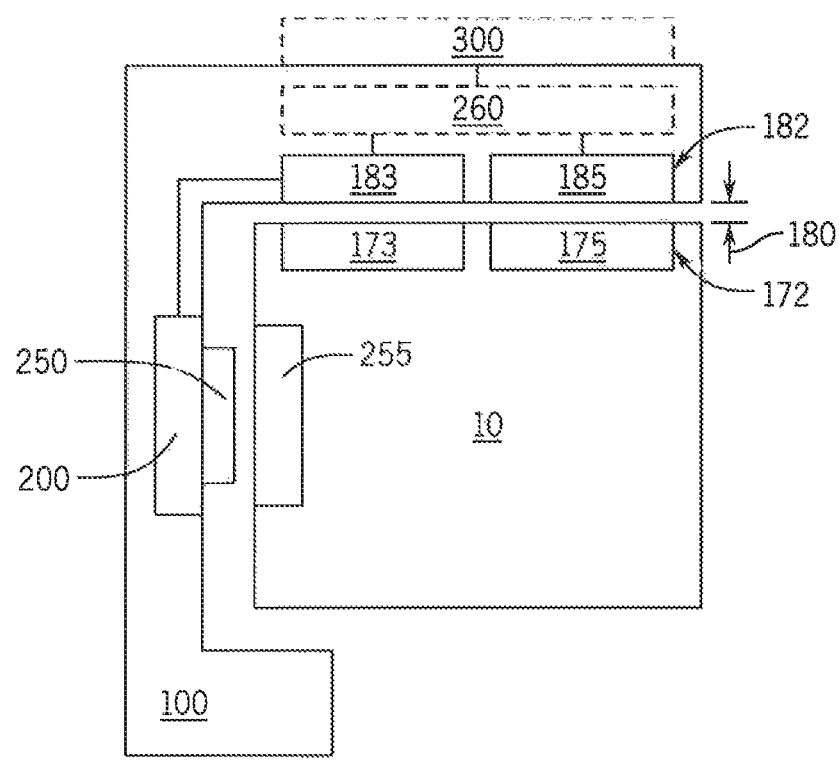
FIG. 13 is a block diagram representation of the mover illustrated in FIG. 12.

According to another embodiment of the invention shown in FIGS. 11-12, the linear drive system includes drive magnets 255 mounted along the track. With reference also to FIG. 4, the drive magnets 255 may be mounted in the channel 23 extending longitudinally along one surface of the track segment 12. A set of drive coils 250 is mounted to each mover 100. The drive coils 250 are mounted to the side member 102 and spaced apart from the drive magnets 255 such that an air gap 141 is defined between each set of drive coils 250 and the drive magnets 255 along the track. The drive magnets 255 are preferably arranged with consecutive magnet segments alternately having a north pole, N, and south pole, S, pole facing the mover 100. The mover 100 further includes a motor drive 200 mounted to the side member 102 and, as illustrated, is positioned between the side member 102 and the drive coils 250. As will be discussed in more detail below, the motor drive 200 receives power from the secondary winding of a sliding transformer configured to wirelessly transmit power between the track and each mover and delivers the power to the drive coils 250. The motor drive 200 controls the voltage and/or current provided to each drive coil 250 such that an electromagnetic field generated by each drive coil 250 on the mover 100 interacts with the drive magnets 255 mounted along the track 10 to control motion of the mover 100 along the track. Mounting the motor drive 200 along the side member 102 allows the side member to serve as a heat sink for the motor drive 200. However, it is contemplated that the motor drive 200 may be mounted in other locations on the mover 100 without deviating from the scope of the invention.

Turning again to FIGS. 4 and 5, a sliding transformer 170 provides wireless power transfer between the track 10 and a mover 100. According to the illustrated embodiment, a primary winding 172 is provided on the track 10 and a secondary winding 182 is provided on the mover 100. The primary winding 172 includes a forward conduction path 173 and a reverse conduction path 175 extending longitudinally along the track 10. According to one embodiment of the invention, the forward and reverse conduction paths 173, 175 may span multiple track segments 12, 14. An electrical connector may be provided between track segments 12, 14 to establish a continuous electrical connection between segments 12, 14. In certain applications, such as a short oval, a single primary winding may be provided. One end for each of the forward and reverse conduction paths is connected to a power source and the other end for each of the forward and reverse conduction paths is electrical connected to each other to establish a conductive loop. In other applications, for example, due to an extended track length, it may be desirable to provide multiple primary windings 172, where each primary winding extends for a portion of the length of the track 10. According to one embodiment of the invention, each track segment 12, 14 includes a separate primary winding 172 extending the length of the track segment.

Figure 5:
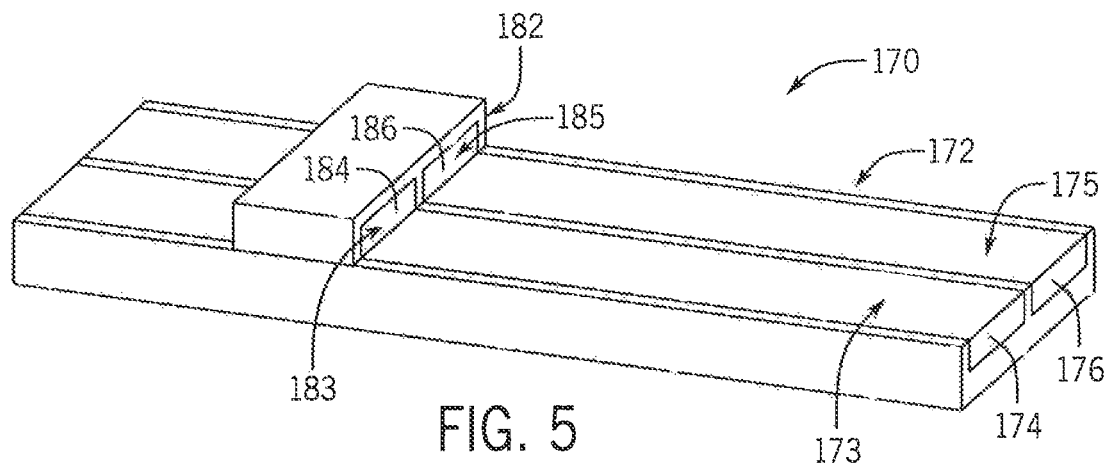
FIG. 5 is an exemplary schematic representation of a sliding transformer incorporated into the transport system of FIG. 4.
Figure 7:
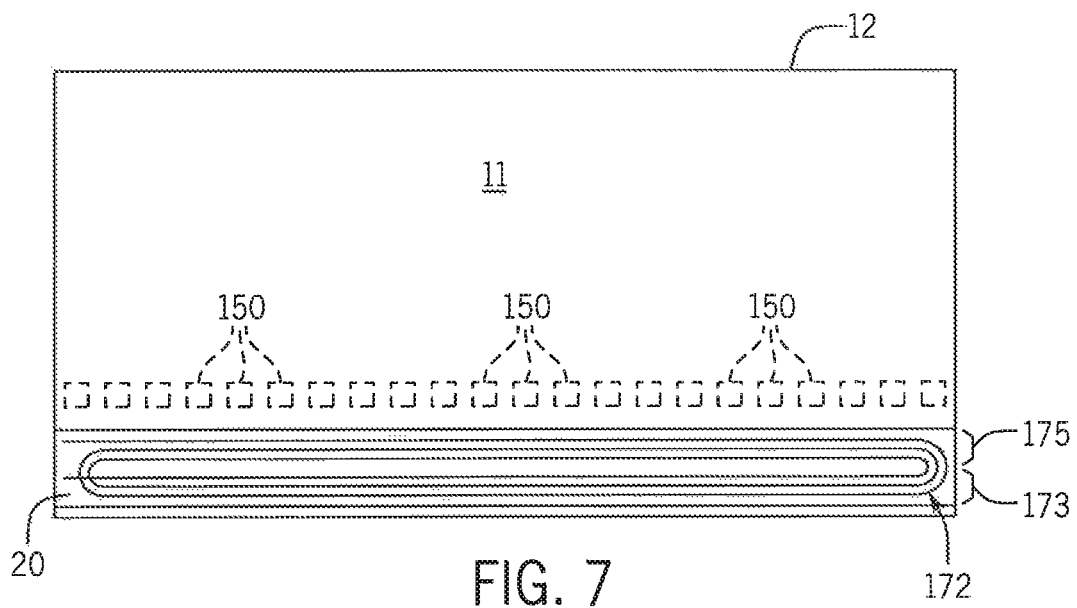
FIG. 7 is a partial top plan view of a track segment illustrating a primary winding for one embodiment of a sliding transformer mounted along the track segment.

The forward and reverse conduction paths 173, 175 for the primary winding 172 may include either a single conductor or multiple conductors. With reference to FIG. 5, a first bus bar 174 is provided in the forward conduction path 173 and a second bus bar 176 is provided in the reverse conduction path 175. If a separate primary winding 172 is present on each track segment, one end of each bus bar 174, 176 is connected to a power source and the other end of each bus bar may include an end cap joining the two bus bars and establishing a conductive loop. If the primary winding 172 spans multiple track segments, then an electrical connector may be provided between track segments to join adjacent bus bars. With reference to FIG. 7, the primary winding 172 may also include multiple conductors in each of the forward and reverse conduction paths 173, 175. According to one embodiment of the invention, a single conductor may be wound along the length of the track segment 12 to form a coil. According to another embodiment of the invention, a printed circuit board (PCB) may be mounted along the length of the track segment 12 and a number of traces may be defined along the PCB to define the coil. In either embodiment, a first portion of the conductors define the forward conduction path 173 and a second portion of the conductors define the reverse conduction path 175.

The secondary winding 182 includes a forward conduction path 183 and a reverse conduction path 185 extending in the direction of motion of the mover 100. It is contemplated that each mover 100 will include a single secondary winding 182. However, in some embodiments, multiple secondary windings 182 may be mounted on a mover 100 with each secondary winding 182 receiving power from the primary winding 172. One end for each of the forward and reverse conduction paths is electrically connected to each other to establish a conductive loop and the other end supplies power to an electrical load on the mover 100. It is contemplated that the electrical load may be an electrical device 300 such as an actuator or a sensor, which may be energized by either an alternating current (AC) voltage or a direct current (DC) voltage. A power converter 260 is provided to regulate the power flow received from the secondary winding 182 to the electrical load.

Figure 8:
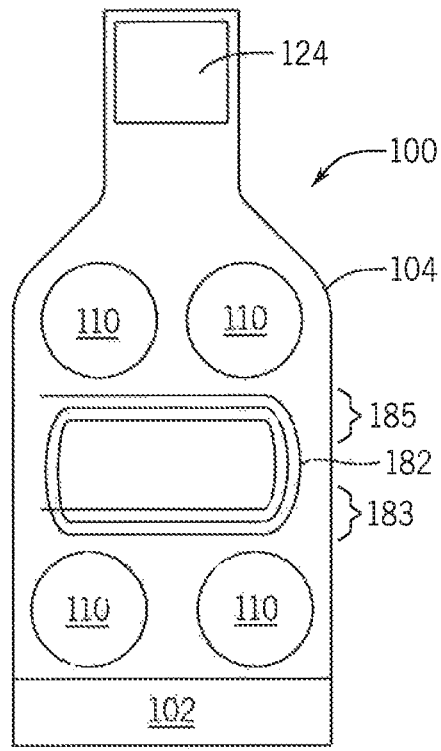
FIG. 8 is a partial sectional view of a mover illustrating a secondary winding for the sliding transformer of FIG. 7 mounted along the lower surface of the top member of the mover.

The forward and reverse conduction paths 183, 185 for the secondary winding 182 may include either a single conductor or multiple conductors. With reference to FIG. 5, a first bus bar 184 is provided in the forward conduction path 183 and a second bus bar 186 is provided in the reverse conduction path 185. One end of each bus bar 184, 186 is connected to the electrical load on the mover 100 and the other end of each bus bar may include an end cap joining the two bus bars and establishing a conductive loop. With reference to FIG. 8, the secondary winding 182 may also include multiple conductors in each of the forward and reverse conduction paths 183, 185. According to one embodiment of the invention, a single conductor may be wound along the mover 100 in the direction of travel of the mover 100 to form a coil. According to another embodiment of the invention, a printed circuit board (PCB) may be mounted to the mover 100 and a number of traces may be defined along the PCB to define the coil. In either embodiment, a first portion of the conductors define the forward conduction path 183 and a second portion of the conductors define the reverse conduction path 185.

Figure 9:
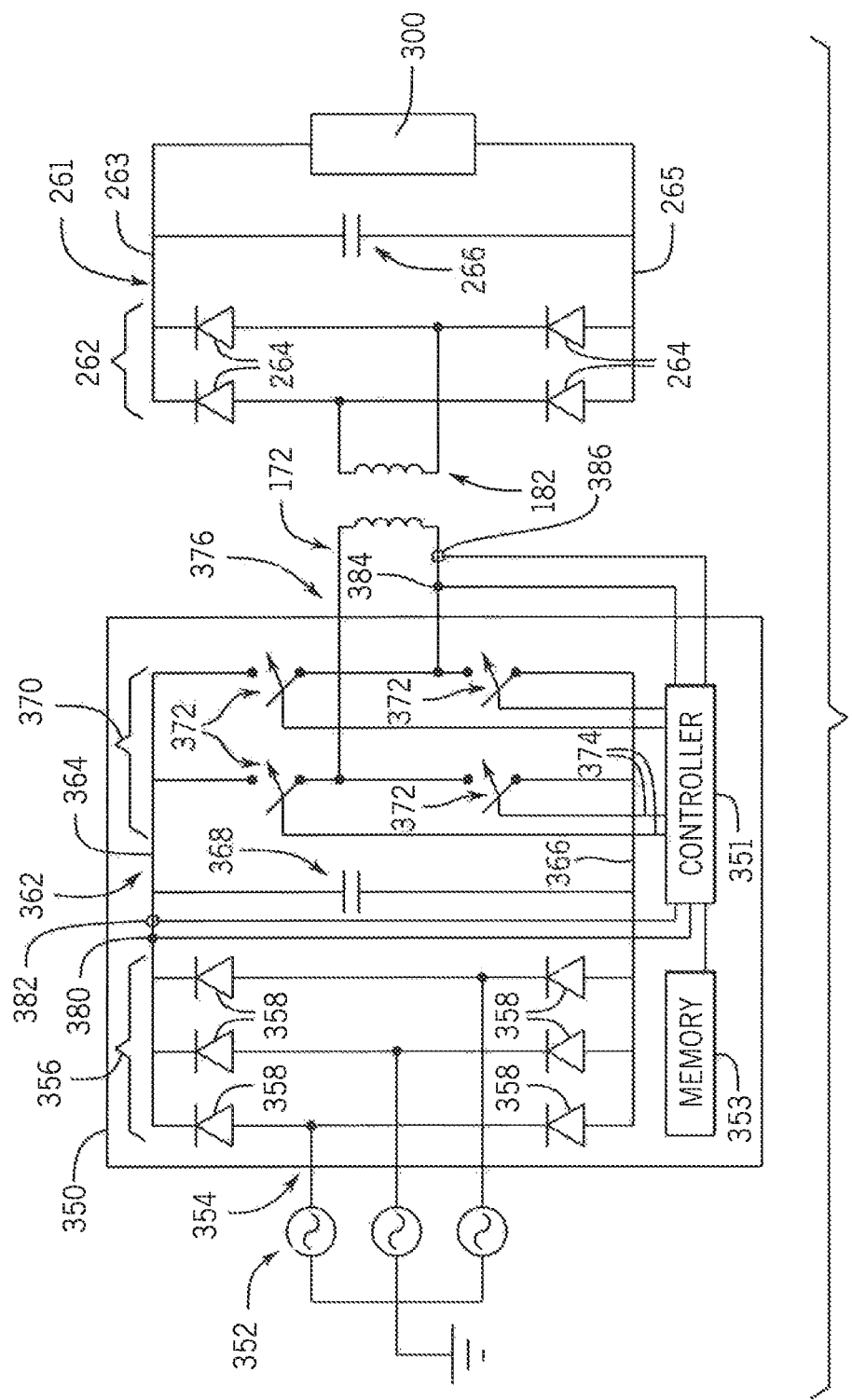
FIG. 9 is a schematic representation of one embodiment of a power converter supplying power to a sliding transformer according to one embodiment of the present invention.

Turning next to FIG. 9, an exemplary power converter 350 for supplying power to the primary winding 172 is illustrated. The power converter 350 is configured to receive a three-phase AC voltage 352 at an input 354 of the power converter. The three-phase AC voltage 352 is, in turn, provided to a rectifier section 356 of the power converter 350. The rectifier section 356 may include any electronic device suitable for passive or active rectification as is understood in the art. According to the illustrated embodiment, the rectifier section 356 includes a set of diodes 358 forming a diode bridge that rectifies the three-phase AC voltage to a DC voltage on the DC bus 362. Optionally, the rectifier section 356 may include other solid-state devices including, but not limited to, thyristors, silicon controlled rectifiers (SCRs), or transistors to convert the input voltage 352 to a DC voltage for the DC bus 362. The DC voltage is present between a positive rail 364 and a negative rail 366 of the DC bus 362. A DC bus capacitor 368 is connected between the positive and negative rails, 364 and 366, to reduce the magnitude of the ripple voltage resulting from converting the AC voltage to a DC voltage. It is understood that the DC bus capacitor 368 may be a single capacitor or multiple capacitors connected in parallel, in series, or a combination thereof. The magnitude of the DC voltage between the positive and negative rails, 364 and 366, is generally equal to the magnitude of the peak of the AC input voltage.

The DC bus 362 is connected in series between the rectifier section 356 and an inverter section 370. The inverter section 370 consists of a number of switches 372. Each switch 372 is preferably a solid-state switching element, such as a transistor, thyristor, or SCR as is known in the art. The switching element may also include a free-wheeling diode connected across the switching element. Each of the switches 372 receives a switching signal, sometimes referred to as a gating signal, 374 to selectively enable the switch 372 and to convert the DC voltage from the DC bus 362 into a controlled AC voltage at an output 376 of the inverter section 370. When enabled, each switch 372 connects the respective rail 364, 366 of the DC bus 362 to an output terminal. The primary winding 172 is connected to the output 376 of the inverter section to receive the controlled AC voltage as a power source for transmitting power from the track 10 to the movers 100.

One or more modules are used to control operation of the power converter 350. The modules may be stored programs executed on one or more processors, logic circuits, or a combination thereof. According to the illustrated embodiment, the power converter 350 includes a controller 351 and a memory device 353 in communication with the controller 351. The controller 351 may be implemented, for example, in a microprocessor, application specific integrated circuit (ASIC), field programmable gate array (FPGA), or other such customizable device. The memory device 353 may include transitory memory, non-transitory memory or a combination thereof. The memory device 353 may be configured to store data and programs, which include a series of instructions executable by the controller 351. It is contemplated that the memory device 353 may be a single device, multiple devices, or incorporated, for example, as a portion of another device such as an application specific integrated circuit (ASIC). The controller 351 is in communication with the memory 353 to read the instructions and data as required to control operation of the power converter 350.

The controller 351 also receives feedback signals indicating the current operation of the power converter 350. The power converter 350 may include a voltage sensor 380 and/or a current sensor 382 on the DC bus 362 generating a feedback signal corresponding to the magnitude of voltage and/or current present on the DC bus 362. The power converter 350 may also include a voltage sensor 384 and/or a current sensor 386 generating a feedback signal corresponding to the magnitude of voltage and/or current present at the output 376 of the inverter section 370. The controller 351 utilizes the feedback signals to generate the switching signals 374 to control operation of the inverter section 370 and to generate an output voltage having a desired magnitude and frequency for the primary winding 172.

Figure 6:
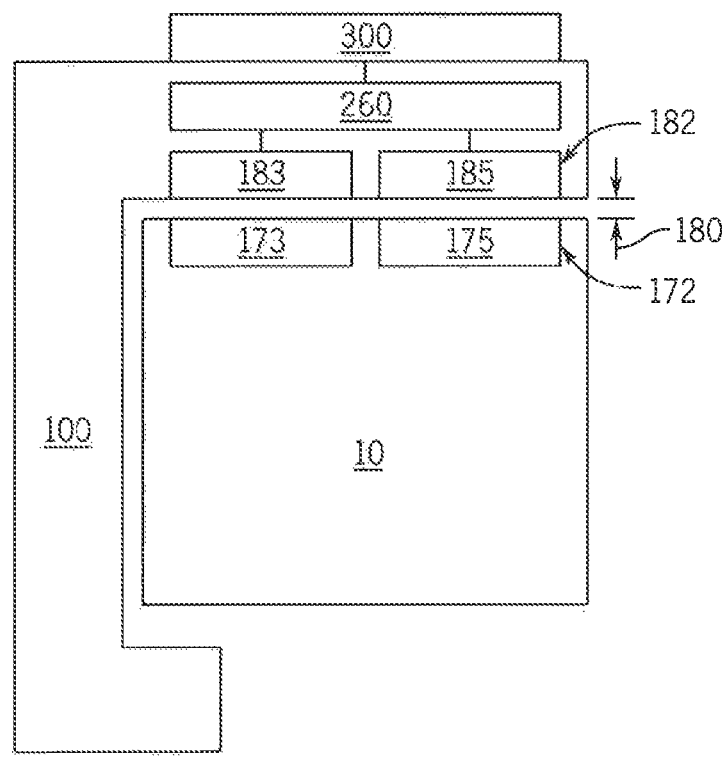
FIG. 6 is a block diagram representation of the mover illustrated in FIG. 3.

With reference also to FIG. 6, the secondary winding 182 is spaced apart from the primary winding 172 by an air gap 180. The current conducted in the primary winding 172 establishes an electromagnetic field along the forward and reverse conduction paths 173, 175. The forward and reverse conduction paths 183, 185 of the secondary winding 182 are generally aligned with the forward and reverse conduction paths 173, 175 of the primary winding 172 and separated by the air gap 180. In order for a current to be induced within the secondary winding 182 by the electromagnetic field generated by the primary winding 172, the secondary winding 182 must be located within the field. Thus, the air gap 180 is small and may be, for example, less than 1.5 millimeters wide and, preferably, is less than 0.75 millimeters wide. In one embodiment of the invention, it is contemplated that the air gap 180 is about 0.5 millimeters wide.

Referring again to FIG. 9, the illustrated mover includes a rectifier section 262 with a set of diodes 264 to convert the AC voltage induced in the secondary winding 182 to a DC voltage present on a DC bus 261. A DC bus capacitor 266 is connected between the positive and negative rails, 263 and 265, to reduce the magnitude of the ripple voltage resulting from converting the AC voltage to a DC voltage. An electrical load 300 may is applied to the DC bus 261. The power converter 350 on the track 10 is configured to regulate the voltage and/or current supplied to the primary winding 172 to, in turn, provide a desired power level to the electrical load 300.

Figure 10:
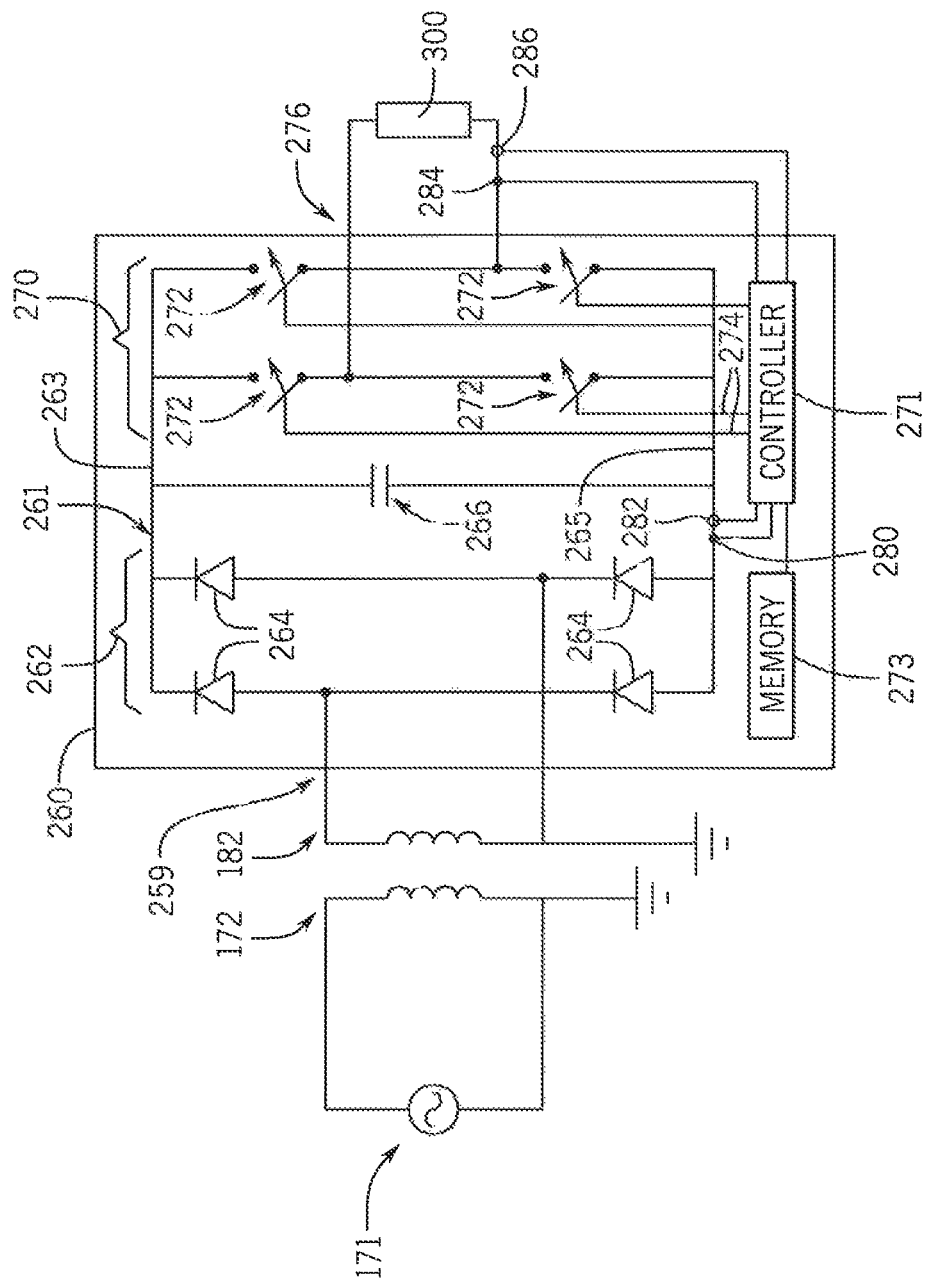
FIG. 10 is a schematic representation of one embodiment of a power converter mounted on the mover to regulate power from a sliding transformer according to one embodiment of the present invention.

According to another embodiment of the invention, shown in FIG. 10, the mover 100 may also include a power converter 260 to regulate power flow on the mover 100. The power converter 260 is configured to receive the AC voltage from the secondary winding 182 at an input 259 of the power converter. The AC voltage is, in turn, provided to a rectifier section 262 of the power converter 260. The rectifier section 262 may include any electronic device suitable for passive or active rectification as is understood in the art. According to the illustrated embodiment, the rectifier section 262 includes a set of diodes 264 forming a diode bridge that rectifies the AC voltage to a DC voltage on the DC bus 261. Optionally, the rectifier section 262 may include other solid-state devices including, but not limited to, thyristors, silicon controlled rectifiers (SCRs), or transistors to convert the input voltage to a DC voltage for the DC bus 261. The DC voltage is present between a positive rail 263 and a negative rail 265 of the DC bus 261. A DC bus capacitor 266 is connected between the positive and negative rails, 263 and 265, to reduce the magnitude of the ripple voltage resulting from converting the AC voltage to a DC voltage. It is understood that the DC bus capacitor 266 may be a single capacitor or multiple capacitors connected in parallel, in series, or a combination thereof. The magnitude of the DC voltage between the positive and negative rails, 263 and 265, is generally equal to the magnitude of the peak of the AC input voltage.

The DC bus 261 is connected in series between the rectifier section 262 and a switching section 270. It is contemplated that the switching section 270 may be configured to provide either an AC voltage output or a DC voltage output. The DC voltage output may be at a different voltage potential than the DC voltage potential present on the DC bus 261. According to the illustrated embodiment, the switching section 270 is arranged as an inverter to provide an AC voltage output. The switching section 270 consists of a number of switches 272. Each switch 272 is preferably a solid-state switching element, such as a transistor, thyristor, or SCR as is known in the art. The switching element may also include a free-wheeling diode connected across the switching element. Each of the switches 272 receives a switching signal, sometimes referred to as a gating signal, 274 to selectively enable the switch 272 and to convert the DC voltage from the DC bus 261 into a controlled AC voltage at an output 276 of the switching section 270. When enabled, each switch 272 connects the respective rail 263, 265 of the DC bus 261 to an output terminal. One or more electrical loads 300 are connected to the output 276 of the inverter section to receive the controlled AC voltage as a power source to enable operation of the device on the mover 100.

One or more modules are used to control operation of the power converter 260. The modules may be stored programs executed on one or more processors, logic circuits, or a combination thereof. According to the illustrated embodiment, the power converter 260 includes a controller 271 and a memory device 273 in communication with the controller 271. The controller 271 may be implemented, for example, in a microprocessor, application specific integrated circuit (ASIC), field programmable gate array (FPGA), or other such customizable device. The memory device 273 may include transitory memory, non-transitory memory or a combination thereof. The memory device 273 may be configured to store data and programs, which include a series of instructions executable by the controller 271. It is contemplated that the memory device 273 may be a single device, multiple devices, or incorporated, for example, as a portion of another device such as an application specific integrated circuit (ASIC). The controller 271 is in communication with the memory 273 to read the instructions and data as required to control operation of the power converter 260.

The power converter 260 also receives feedback signals indicating the current operation of the power converter 260. The power converter 260 may include a voltage sensor 280 and/or a current sensor 282 on the DC bus 261 generating a feedback signal corresponding to the magnitude of voltage and/or current present on the DC bus 261. The power converter 260 may also include a voltage sensor 284 and/or a current sensor 286 generating a feedback signal corresponding to the magnitude of voltage and/or current present at the output 276 of the switching section 270. The controller 271 utilizes the feedback signals to generate the switching signals 274 to control operation of the switching section 270 and to generate a desired output voltage for the load 300 present on the mover 100.

As previously indicated, one embodiment of the linear drive system includes drive magnets 255 arranged along the track 10 and drive coils 250 mounted to each mover. With reference then to FIGS. 11-14, one arrangement of a controller for this embodiment of the linear drive system is illustrated. A sliding transformer is provided between the track 10 and each mover 100 in the manner discussed above. Each mover 100 further includes a motor drive 200 configured to receive power from the secondary winding 182 on the mover 100.

The motor drive 200 is configured to receive an AC voltage from the secondary winding 182 at an input 202 of the motor drive. The AC voltage is, in turn, provided to a rectifier section 204 of the motor drive 200. The rectifier section 204 may include any electronic device suitable for passive or active rectification as is understood in the art. According to the illustrated embodiment, the rectifier section 204 includes a set of diodes 206 forming a diode bridge that rectifies the three-phase AC voltage to a DC voltage on the DC bus 208. Optionally, the rectifier section 204 may include other solid-state devices including, but not limited to, thyristors, silicon controlled rectifiers (SCRs), or transistors to convert the input voltage to a DC voltage for the DC bus 208. The DC voltage is present between a positive rail 210 and a negative rail 212 of the DC bus 208. A DC bus capacitor 214 is connected between the positive and negative rails, 210 and 212, to reduce the magnitude of the ripple voltage resulting from converting the AC voltage to a DC voltage. It is understood that the DC bus capacitor 214 may be a single capacitor or multiple capacitors connected in parallel, in series, or a combination thereof. The magnitude of the DC voltage between the positive and negative rails, 210 and 212, is generally equal to the magnitude of the peak of the AC input voltage.

The DC bus 208 is connected in series between the rectifier section 204 and an inverter section 220. The inverter section 220 consists of a number of switches 222. Each switch 222 is preferably a solid-state switching element, such as a transistor, thyristor, or SCR as is known in the art. The switching element may also include a free-wheeling diode connected across the switching element. Each of the switches 222 receives a switching signal, sometimes referred to as a gating signal, 224 to selectively enable the switch 222 and to convert the DC voltage from the DC bus 208 into a controlled AC voltage at an output 226 of the inverter section 220. When enabled, each switch 222 connects the respective rail 210, 212 of the DC bus 208 to an output terminal. The drive windings 250 are connected to the output 226 of the inverter section to receive the controlled AC voltage to establish an electromagnetic field to interact with the drive magnets 255 and control motion of the corresponding mover 100.

One or more modules are used to control operation of the motor drive 200. The modules may be stored programs executed on one or more processors, logic circuits, or a combination thereof. According to the illustrated embodiment, the motor drive 200 includes a controller 230 and a memory device 232 in communication with the controller 230. The controller 230 may be implemented, for example, in a microprocessor, application specific integrated circuit (ASIC), field programmable gate array (FPGA), or other such customizable device. The memory device 232 may include transitory memory, non-transitory memory or a combination thereof. The memory device 232 may be configured to store data and programs, which include a series of instructions executable by the controller 230. It is contemplated that the memory device 232 may be a single device, multiple devices, or incorporated, for example, as a portion of another device such as an application specific integrated circuit (ASIC). The controller 230 is in communication with the memory 232 to read the instructions and data as required to control operation of the motor drive 200.

The motor drive 200 also receives feedback signals indicating the current operation of the motor drive 200. The motor drive 200 may include a voltage sensor 236 and/or a current sensor 238 on the DC bus 208 generating a feedback signal corresponding to the magnitude of voltage and/or current present on the DC bus 208. The motor drive 200 may also include a voltage sensor 240 and/or a current sensor 242 generating a feedback signal corresponding to the magnitude of voltage and/or current present at the output 226 of the inverter section 220. The controller 230 utilizes the feedback signals to generate the switching signals 224 to control operation of the inverter section 220 and to generate a desired output voltage for each drive winding 250 present on the mover 100.

Figure 14:
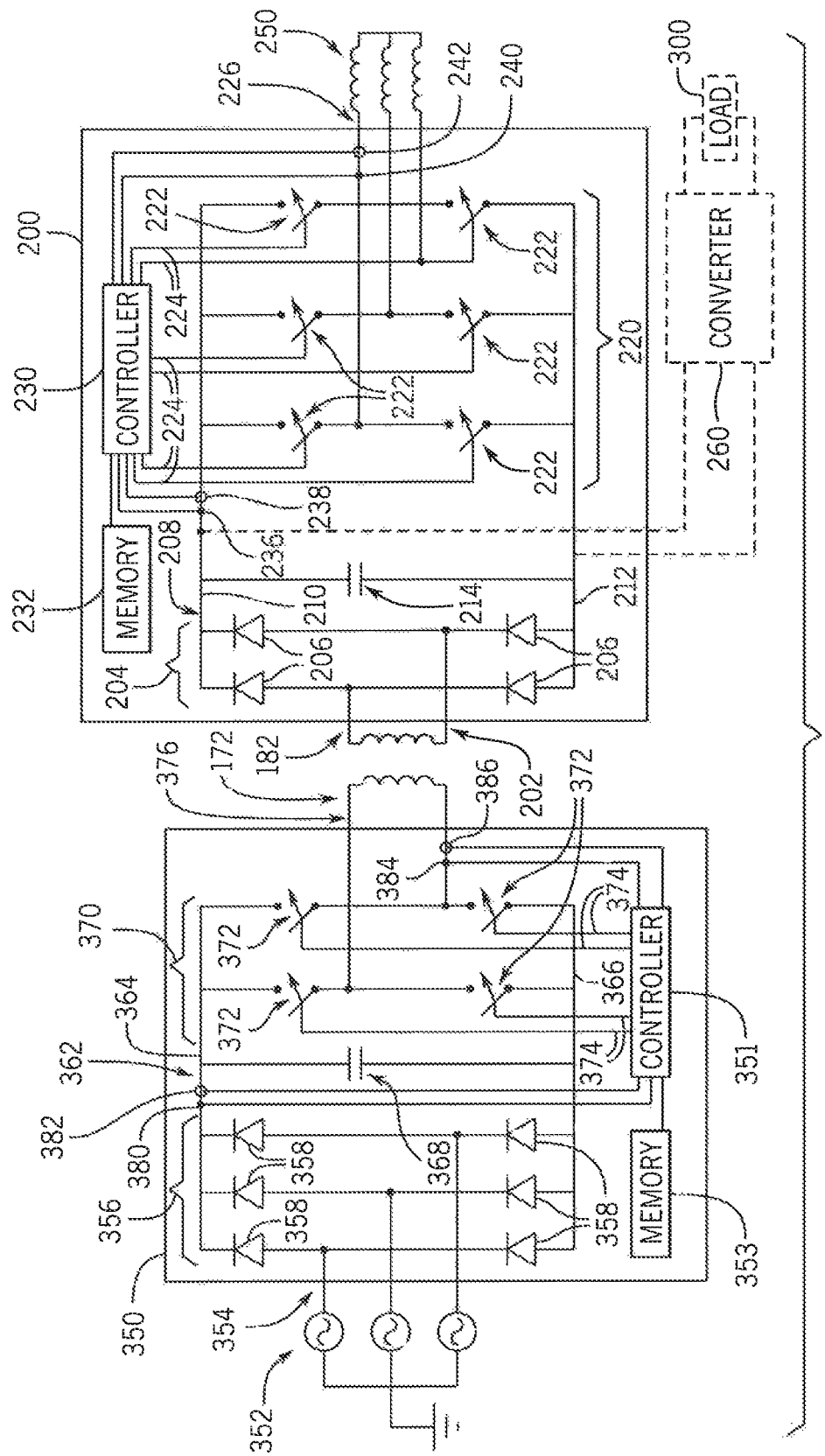
FIG. 14 is a schematic representation of a motor drive mounted on the mover to regulate power from a sliding transformer to drive coils on the mover according to one embodiment of the invention.

It is further contemplated that a mover 100 with a motor drive 200 may also include one or more electronic devices mounted to the mover 100. As illustrated, a load 300 is powered by a power converter 260, separate from the motor drive 200, also mounted to the mover 100. The illustrated power converter 260 includes only a switching section 270 as described above with respect to FIG. 10. The DC bus of the power converter 260 illustrated in FIG. 14 is connected directly to the DC bus 208 of the motor drive 200. Optionally, the power converter 260 may include an input receiving power from the secondary winding 182 in the same manner as the power converter 260 of FIG. 10. According to still another embodiment, the mover 100 may include multiple secondary windings 182, where one secondary winding is connected to an input 202 of the motor drive 200 and another secondary winding is connected to an input of the power converter 260 for the additional load 300.

In operation, the sliding transformer wirelessly provides power from the track 10 to each mover 100 travelling along the track 10. According to one embodiment of the invention, a utility power supply 171 is connected to the primary winding 172, as shown in FIG. 10. The utility power supply 171 provides power at a fixed voltage and frequency and the power converter 260 on each mover 100 regulates power drawn from the secondary winding 182. According to another embodiment of the invention, a power converter 350 is connected between a utility power supply and the primary winding 172, as shown in FIG. 9. The power converter 350 may be controlled to provide a voltage to the primary winding 172 with a variable voltage and/or a variable frequency. If the primary winding 172 spans multiple track segments, a single connection to the power supply is provided for each primary winding and suitable connectors are provided between segments to join the forward and reverse conduction paths. If a separate primary winding 172 is provided for each track segment 12, a separate power converter 350 may be provided on each track segment to convert power from an input power source to a modulated voltage for the primary winding 172.

At a fixed voltage level, for example, 110 VAC, the frequency of the voltage applied to the primary winding 172 impacts the amount of power transferred between the primary and secondary windings and also impacts the level of voltage ripple present at the secondary winding. With a utility power supply 171, voltage is provided, for example, at 110 VAC and 60 Hz. With a power converter 350 supplying power to the primary winding 172, the output may be modulated to provide voltage at a higher frequency, ranging, for example, from 60-2000 Hz. According to one embodiment of the invention, the voltage is provided with a frequency in a range of 250-1000 Hz.

Increasing the frequency of the voltage supplied to the primary winding, impacts voltage coupling between the primary winding 172 and the secondary winding 182. As the frequency of the voltage increases, the ripple on the voltage present on the secondary winding 182 decreases. As a result, the capacitance value for the DC bus capacitor 266 present on the mover 100 can be decreased. However, as the frequency increases, the amplitude of the voltage present on the secondary winding decreases and, therefore, the total power transferred similarly decreases. A comparison of the voltages and power present on the secondary winding of an exemplary sliding transformer is presented in Table 1 below. The amplitude of input voltage is constant at 110 VAC and the number of turns on the secondary winding is constant at sixty turns.

TABLE 1

Evaluation of different frequencies of voltage provided to a primary winding with a secondary winding having 60 turns

| | Frequency | | |
|---|---|---|---|
| | 60 Hz | 250 Hz | 1000 Hz |
| $V_{avg}$ (V) | 80 | 79 | 62 |
| $V_{ripple}$ ($V_{pk-pk}$) | 30 | 6 | 1 |
| $P_{avg}$ (W) | 713 | 629 | 386 |

The power transferred between the primary winding 172 and the secondary winding 182 is further influenced by the number of turns present in the secondary winding. According to one embodiment of the invention, the number of turns present in the primary winding matches the number of turns present in the secondary winding to provide a 1:1 turns ratio. It is contemplated that various other turns ratios may be utilized without deviating from the scope of the invention. As the number of turns in the secondary winding 182 increases, the voltage level on the secondary winding decreases. However, as the number of turns in the secondary winding 182 increases, the magnitude of voltage ripple also decreases. Thus, to increase the power transferred between the primary and secondary windings, it is preferable to have a lower number of turns on the secondary winding. A comparison of the voltages and power present on the secondary winding of an exemplary sliding transformer as a result of different numbers of turns on the secondary winding is presented in Table 2 below. The amplitude of input voltage is constant at 110 VAC and the frequency of the input voltage is constant at sixty Hertz.

TABLE 2

Evaluation of different numbers of turns on a secondary winding with a constant frequency supplied to a primary winding

| | Secondary Turns | | |
|---|---|---|---|
| | 60 | 40 | 20 |
| $V_{avg}$ (V) | 80 | 81 | 82 |
| $V_{ripple}$ ($V_{pk-pk}$) | 30 | 37 | 38 |
| $P_{avg}$ (W) | 713 | 705 | 745 |

In addition, the present inventors have identified that the effect of increasing the frequency of the voltage supplied to the primary winding 172 has less impact on the voltage drop when the number of turns of the secondary winding 182 is decreased. For example, when the number of turns on the secondary winding is twenty turns, the average voltage remains about constant as the frequency of the voltage supplied to the primary winding increases. In fact, the average voltage increases slightly as the voltage ripple decreases providing an improved voltage on the secondary winding. A comparison of the voltages and power present on the secondary winding of another exemplary sliding transformer is presented in Table 3 below. The amplitude of input voltage is constant at 110 VAC and the number of turns on the secondary winding is constant at twenty turns.

TABLE 3

Evaluation of different frequencies of voltage provided to a primary winding with a secondary winding having 20 turns

| | Frequency | |
|---|---|---|
| | 60 Hz | 1000 Hz |
| $V_{avg}$ (V) | 82 | 88 |
| $V_{ripple}$ ($V_{pk-pk}$) | 38 | 2 |
| $P_{avg}$ (W) | 745 | 770 |

According to one embodiment of the invention, each of the primary and secondary windings have the same number of turns and, therefore, have a 1:1 turns ratio. The primary winding 172 includes a first coil extending along the length of each track segment 12 and each mover 100 includes a secondary winding 182 having eighty or fewer turns and, preferably, between twenty and sixty turns. The primary winding is connected to a utility supply and, therefore, receives a fixed sixty hertz input voltage. Connecting the primary winding directly to the utility supply provides a reduced system cost by not requiring a power converter to supply a variable frequency voltage to each primary winding.

In alternate embodiments, however, it is contemplated that a power converter 350 is provided to supply a variable frequency voltage to the primary winding 172. When a power converter is provided to supply voltage to the primary winding 172, the frequency of the voltage may be supplied at 200 Hz or greater and, preferably at 1000 Hz or greater. It is further contemplated that the turns ratio between the primary and secondary windings may be varied.

It is further contemplated that the mover 100 may include an energy storage device to supplement operation of the motor drive 200 or power converter 260. During, for example, periods of short term power loss, the energy storage device may allow the motor drive 200 or power converter 260 to continue operation. The energy storage device may be the DC bus capacitor 214, 366 present in the motor drive 200 or power converter 260, respectively. The DC bus capacitor may be sized, for example, to include sufficient power to allow a mover 100 to traverse a gap between primary windings 172. Such a gap may exist between track segments 12 if separate primary windings 172 are provided on each segment. Optionally, the energy storage device may include a larger capacity and may be, for example, a super capacitor or a battery, where the energy storage device may provide sufficient energy, for example, such that the mover 100 may traverse one or more track segments that do not include a primary winding. Thus, the mover 100 may receive power during one segment of the track and utilize the stored power along another section of the track.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. An apparatus for wireless power transfer in an independent moving cart control system, the apparatus comprising:
a plurality of movers, wherein each of the plurality of movers includes at least one drive magnet mounted to the mover;
a track having a length and defining a path along which each of the plurality of movers travels;

a plurality of coils positioned along the length of the track, wherein the plurality of coils are controlled to generate an electromagnetic field to interact with the at least one drive magnet mounted on each of the plurality of movers to control operation of each of the plurality of movers;

a plurality of electrical devices, wherein at least one of the electrical devices is mounted to each of the plurality of movers;

a plurality of primary windings mounted along a length of the track wherein each of the primary windings is configured to receive power from a power supply;

a plurality of secondary windings, wherein:
- each secondary winding is mounted to one of the plurality of movers,
- each secondary winding is mounted on the corresponding mover with an air gap separating the secondary winding from each of the plurality of primary windings as the mover travels along the track, and
- each secondary winding receives power across the air gap from the plurality of primary windings; and a plurality of power converters, wherein each of the plurality of power converters is mounted to one of the plurality of movers and is operative to receive the power from the secondary winding mounted to the mover and to supply the power to the at least one electrical device mounted on the mover.

2. The apparatus of claim 1 further comprising an other power converter operative to generate an AC voltage having a variable amplitude and a varying frequency, wherein the other power converter is the power supply connected to the primary winding.

3. The apparatus of claim 2 further comprising a plurality of other power converters wherein the track includes a plurality of track segments and wherein each track segment includes one of the plurality of other power converters to supply power to the plurality of primary windings on the corresponding track segment.

4. The apparatus of claim 1 further comprising an inverter configured to receive a Direct Current (DC) voltage at an input and to supply an Alternating Current (AC) voltage at an output to at least one of the plurality of primary windings.

5. The apparatus of claim 4 wherein the inverter includes a DC bus connected to the input of the inverter to receive the DC voltage and wherein the inverter utilizes a modulation routine to selectively connect switching elements between the DC bus and the output of the inverter to generate the AC voltage at the output.

6. The apparatus of claim 1 wherein each of the plurality of movers includes at least two secondary windings.

7. An apparatus for wireless power transfer in a motion an independent moving cart control system, the apparatus comprising:

a plurality of movers, wherein each of the plurality of movers includes at least one drive magnet mounted to the mover;

a track having a length and defining a path along which each of the plurality of movers travels;

a plurality of coils positioned along the length of the track, wherein the plurality of coils are controlled to generate a first electromagnetic field to interact with the at least one drive magnet mounted on each of the plurality of movers to control operation of each of the plurality of movers;

at least one primary winding mounted along the track, wherein the at least one primary winding is configured to generate a second electromagnetic field to span an air gap adjacent to the at least one primary winding;

a plurality of secondary windings, wherein each secondary winding is mounted to one of the plurality of movers such that each secondary winding is located on an opposite side of the air gap from the at least one primary winding and within the second electromagnetic field to receive power from the at least one primary winding as the corresponding mover travels past the at least one primary winding; and a plurality of electrical devices, wherein at least one of the electrical devices is mounted to each of the plurality of movers and is configured to receive the power from the secondary winding on the corresponding mover.

8. The apparatus of claim 7 further comprising:
a plurality of power converters, wherein:
- each of the plurality of power converters is mounted to one of the plurality of movers,
- each of the plurality of power converters is operative to receive the power from the secondary winding on the corresponding mover, and
- each of the plurality of power converters is operative to supply the power to the at least one electrical device mounted on the corresponding mover.

9. The apparatus of claim 7 wherein the at least one primary winding includes a plurality of primary windings mounted along a length of the track and each of the plurality of primary windings is configured to receive power from a power supply.

10. The apparatus of claim 9 wherein the track includes a plurality of track segments and each track segment includes at least one of the plurality of primary windings.

11. The apparatus of claim 9 further comprising at least one power converter operative to generate an AC voltage having a variable amplitude and a varying frequency, wherein the at least one power converter supplies power to the plurality of primary windings.

12. The apparatus of claim 7 wherein each of the plurality of movers includes at least two secondary windings.

13. The apparatus of claim 7 further comprising an inverter configured to receive a Direct Current (DC) voltage at an input and to supply an Alternating Current (AC) voltage at an output to the at least one primary winding.

14. The apparatus of claim 13 wherein the inverter includes a DC bus connected to the input of the inverter to receive the DC voltage and wherein the inverter utilizes a modulation routine to selectively connect switching elements between the DC bus and the output of the inverter to generate the AC voltage at the output.

15. A method for wirelessly transferring power in an independent moving cart control system between a plurality of movers and a track along which each of the plurality of movers travels, the method comprising the steps of:

generating a first electromagnetic field with a plurality of coils positioned along a length of the track;

positioning each of the plurality of movers along the track by controlling the first electromagnetic field generated by each of the plurality of coils to interact with at least one drive magnet mounted on each of the plurality of movers;

generating a second electromagnetic field with a plurality of primary windings mounted along a length of the track responsive to receiving power from a power supply operatively connected to the plurality of primary windings;

transferring power from the plurality of primary windings to each of the plurality of movers along the track, wherein each of the plurality of movers includes a secondary winding mounted on the corresponding mover such that the secondary winding is located in the second electromagnetic field and that an air gap is present between the plurality of primary windings and the secondary winding as the mover travels along the track; and supplying power received in the secondary winding to at least one electrical device mounted on the corresponding mover.

16. The method of claim 15 wherein a power converter is operative to generate an AC voltage having a variable amplitude and a varying frequency and wherein the power converter is the power supply operatively connected to the plurality of primary windings.

17. The method of claim 15 further comprising the steps of:

generating an AC voltage having a variable amplitude and a varying frequency with at least one power converter; and supplying the power to each of the plurality of primary windings from the at least one power converter.

18. The method of claim 15 wherein each of the plurality of movers includes at least two secondary windings.

19. The method of claim 15 further comprising the steps of:

receiving a Direct Current (DC) voltage at an input of an inverter;

generating an Alternating Current (AC) voltage at an output of the inverter; and providing the AC voltage to the plurality of primary windings.

20. The method of claim 19 wherein the inverter includes a DC bus connected to the input of the inverter to receive the DC voltage and wherein the inverter utilizes a modulation routine to selectively connect switching elements between the DC bus and the output of the inverter to generate the AC voltage at the output.

* * * * *